United States Patent [19]

Tonkyn et al.

[11] 4,098,693
[45] Jul. 4, 1978

[54] CATIONIC CHLORINE-RESISTANT POLYMERIC FLOCCULANTS AND THEIR USE

[75] Inventors: Richard G. Tonkyn, Cornwells Heights; Norman Vorchheimer, Buckingham, both of Pa.

[73] Assignee: Betz Laboratories, Inc., Trevose, Pa.

[21] Appl. No.: 646,299

[22] Filed: Jan. 2, 1976

Related U.S. Application Data

[63] Continuation-in-part of Ser. No. 393,367, Aug. 31, 1973, abandoned.

[51] Int. Cl.$^2$ .............................................. C02B 1/20
[52] U.S. Cl. ...................................... 210/52; 210/54
[58] Field of Search ................................ 210/52–54; 260/2 BP, 584 R

[56] References Cited

U.S. PATENT DOCUMENTS

| | | | |
|---|---|---|---|
| 3,493,502 | 2/1970 | Coscia | 210/54 |
| 3,523,892 | 8/1970 | Schiegg | 210/54 |
| 3,567,659 | 3/1971 | Nagy | 260/2 BP |
| 3,577,313 | 5/1971 | Bolger et al. | 260/2 BP |
| 3,725,312 | 4/1973 | Panzer et al. | 260/2 BP |
| 3,738,945 | 6/1973 | Panzer et al. | 210/54 |
| 3,854,970 | 12/1974 | Aitken | 106/210 |
| 3,855,299 | 12/1974 | Witt | 260/584 R |
| 3,900,423 | 8/1975 | Markofsky | 252/358 |

*Primary Examiner*—Charles N. Hart
*Assistant Examiner*—Peter A. Hruskoci
*Attorney, Agent, or Firm*—Alexander D. Ricci; Steven H. Markowitz

[57] ABSTRACT

Cationic, chlorine-resistant polymeric materials, useful as flocculants, are prepared by reacting an epihalohydrin with a mixture consisting of a lower di-alkylamine and ammonia, where the molar ratio of the amine to ammonia is from about 5:1 to about 2:1, and the ratio of the epihalohydrin to the amine-ammonia mixture is from about 0.9 up to the functional equivalency of the amine mixture, for a time and at temperature conditions such that the resultant polymeric material has a viscosity of about 50 cps to about 4000 cps (Brookfield, spindle 1, 12 rpm) at about 50% real solids content.

6 Claims, No Drawings

CATIONIC CHLORINE-RESISTANT POLYMERIC FLOCCULANTS AND THEIR USE

BACKGROUND OF THE INVENTION

This is a continuation-in-part application of Ser. No. 393,367 filed Aug. 31, 1973, now abandoned.

Surface water clarification systems and certain types of industrial wastewater systems have, in the past, employed inorganic coagulants such as alum and iron salts. These coagulants have some disadvantages, primary of which is the volume of coagulated sludge. Frequently, the coagulant and the objectionable solids form a gel mass which is ponderous in size and difficult to dewater. Recently cationic polymeric materials have begun to be used as partial or complete replacements for the inorganic coagulants, with widely varying results. As surface-water clarifiers, most cationic polymers have the serious disadvantage of being subject to chlorine attack, rendering them ineffective in attracting oppositely-charged waste solids, and eliminating their utility to chlorinated potable water clarification systems. Also, some polymers cannot be used effectively with coagulant aids such as clay, lime, iron salts and alum. Occasionally, it will be desirable to use polymer to initiate the flocculation of the suspended solids, and then to employ minor amounts of the above standard coagulants to increase the size of the floc and the settling rate.

On June 12, 1973, a patent issued to Panzer, U.S. Pat. No. 3,738,945, disclosing, in part, a process for producing a polyquaternary flocculant, by reacting an epihalohydrin, a lower di-alkylamine and a poly-functional amine, which could be ammonia. This disclosure, however, limited the reaction to situations wherein the molar amount of the polyfunctional amine could be no more than 15% of the total amine content of the reaction, and the epihalohydrin to amine ratio must be at least one.

Well before this patent issued, the applicants herein had discovered a method by which effective polyquaternary flocculants could be obtained with the above general reactants, using ammonia as the polyfunctional amine, where the molar amount of ammonia can range from about 15% to about 33%, of the total amine content, and where the ratio of epihalohydrin to the ammonia - lower di-alkylamine mixture can be from 0.9 to the functional equivalency of the amine mixture.

In general, flocculants prepared within the latter amounts of reactants, when diluted to between 45% and 55% real solids content, possess a viscosity of between about 50 cps and 4000 cps (Brookfield, spindle 1, 12 rpm), and preferably between about 100 cps and 4000 cps.

The flocculants of this invention are considerably effective in clarifying aqueous systems containing undesirable particulate matter, and are compatible with the conventional flocculating agents, such as alum, clay, and iron salts. They are chlorine-resistant since substantially all of the nitrogen atoms in the polymer are quaternized, with the exception of nitrogens at the very end of the polymer chain. Also, for this reason, the higher the viscosity of the product, which reflects greater chain length, the fewer non-quaternized nitrogens are present. The polymer itself is cationic, with one positive charge per nitrogen group, and is in electrical balance with the equal number of halogen anions present.

SUMMARY OF THE INVENTION

It is an object of this invention to produce cationic, polyquaternized polymeric material, which is substantially resistant to attack by free halogen atoms in aqueous media.

It is a further object to produce such polymeric material by reacting a lower di-alkylamine, ammonia and an epihalohydrin, where the ammonia level is from about 15% to about 33% of the total molar amount of the ammonia-amine combination, and the ratio of the epihalohydrin to said combination is at least 0.9.

DETAILED DESCRIPTION OF THE INVENTION

The polymeric material of this invention is obtained by combining a mixture of the lower di-alkylamine and ammonia with the epihalohydrin, in such a manner as to control the heat generated by the exothermic reaction. The temperature is preferably kept below about 60° C, and most preferably below about 40° C during the process of combination. The initial water content should be between about 25% and 50% on a weight basis. After about 90% of the epihalohydrin has been combined, the mixture is heated to about 90° C, and the remainder of the epihalohydrin is then combined in incremental amounts until the desired viscosity is reached. As the desired viscosity is approached, the mixture is then cooled by external means and/or by addition of water to below about 80° C. If necessary, the reaction can then be terminated by adding acid. The product is also stabilized by lowering the pH to 6 or below.

The preferred di-alkylamine is dimethylamine, however, any di-alkyl amine with one to three carbons per alkyl group is considered to be useful. The preferred epihalohydrin is epichlorohydrin, but the invention is considered to include any halogen entity.

As mentioned above, the amount of ammonia relative to the total molar amount of the ammonia-amine combination is from about 15% to about 33%, and preferably about 17% to about 25%. The epihalohydrin content can be as low as 0.9 of the ammonia-amine content up to the functional limits of the $NH_3$-amine mixture.

The viscosity of the resultant product will be used to approximate chain lengths of the polymer, (the higher the viscosity, the longer the chain, etc.), and the solids contents referred to hereafter include the organic solids as well as the anion content, hereafter called the real solids content.

EXAMPLE 1

To 450 g. (4.0 mole) of 40% aqueous di-methylamine and 60.8 g. (1.0 mole) of 29% aqueous ammonia in a 2000 ml. resin kettle equipped with thermometer, stirrer, reflux condenser, and addition funnel, is added dropwise, over a period of 2 hours at a temperature below 40° C, 412.9 g. (4.5 mole) of epichlorohydrin. The solution is heated at 90° C for one hour. A total of 45.9 g. (0.5 mole) of epichlorohydrin is then added at 90° C in decreasing portions with the solution being heated at 90° C for 20 minutes between each addition. Then, the mixture is cooled externally down to about 80° C. Sulfuric acid (conc.) is then added to lower the pH to 2.5. The product has a viscosity of about 3600 cps (Brookfield, spindle 1, 12 rpm) when diluted to 50% solids.

Following are additional examples of polymeric material prepared according to the procedure of Example 1.

| Example | Mole Ratio DMA/NH$_3$ | Total Moles Amine | EPI, moles | % Solids | Viscosity Brookfield Sp. 1, 12 rpm |
|---|---|---|---|---|---|
| 2 | 2/1 | 6.1 | 5.7 | 50 | 1040 |
| 3 | 2.3/1 | 6.7 | 6.5 | 50 | 2200 |
| 4 | 2.3/1 | 6.7 | 6.4 | 50 | 1100 |
| 5 | 3/1 | 8.1 | 7.7 | 50 | 2650 |
| 6 | 3.5/1 | 4.5 | 4.6 | 50 | 3750 |
| 7 | 3.5/1 | 4.5 | 4.7 | 50 | 1975 |
| 8 | 3.5/1 | 4.5 | 4.7 | 50 | 875 |
| 9 | 4/1 | 5.0 | 5.5 | 50 | 825 |
| 10 | 4/1 | 2.5 | 3.0 | 50 | 912 |
| 11 | 4/1 | 5.0 | 6.0 | 50 | 1250 |
| 12 | 4/1 | 5.0 | 5.4 | 50 | 2000 |
| 13 | 4/1 | 5.0 | 5.4 | 50 | 1550 |
| 14 | 4/1 | 5.0 | 4.9 | 50 | 407 |
| 15 | 5/1 | 4.8 | 4.9 | 50 | 540 |

Upon simple comparison of the present inventive method steps, as clearly described in the disclosure of the invention and the above example, with the method steps in the above-discussed patent to Panzer et al it should readily occur to the artisan that the use of a caustic addition free reaction mixture, (i.e., the addition of no caustic other than that which might be imparted by the reactants) accounts for the effective dialkylamine-ammonia-epihalohydrin flocculant made by the present inventors in contradistinction to the flocculant taught by Panzer et al. For example, Example 2 of Panzer et al teaches the addition of K$_2$CO$_3$ to the reaction mixture and Example 3 teaches the addition of NaOH thereto.

The polymeric materials made by the process of this invention were tested for their ability to clarify turbid water samples taken from Lower Natchez Valley Authority River water. The river water is measured for turbidity using a turbidimeter calibrated in Jackson Turbidity Units (JTU). A lower number indicates greater water clarity. Analysis of the water samples indicated that the suspended particles contained therein were composed of muds, silts, siliceous materials, organic matter, waste lignin, wood chips, vegetation and tannins.

The data which follow indicate clearly that the polymeric material made by the process of this invention is effective in substantially improving the clarity of the waters.

Table 1

| Polymer | Polymer Conc., ppm | Residual Chlorine, ppm | Turbidity Initial | (JTU) Final |
|---|---|---|---|---|
| Example 1 | 1.5 | None | 61 | 23 |
| Example 1 | 1.75 | None | 61 | 18 |
| Example 1 | 1.75 | 1 | 61 | 23 |
| Example 2 | 6 | None | 56 | 40 |
| Example 2 | 7 | None | 56 | 28 |
| Example 4 | 0.75 | None | 66 | 33 |

Table 1-continued

| Polymer | Polymer Conc., ppm | Residual Chlorine, ppm | Turbidity Initial | (JTU) Final |
|---|---|---|---|---|
| Example 4 | 1 | None | 66 | 21 |
| Example 4 | 1 | 1 | 66 | 29 |
| Example 5 | 6 | None | 65 | 29 |
| Example 5 | 7 | None | 65 | 22 |
| Example 6 | 7.5 | None | 65 | 41 |
| Example 6 | 8 | None | 65 | 29 |
| Example 6 | 8 | 1 | 65 | 30 |
| Example 9 | 2.5 | None | 54 | 25 |
| Example 9 | 2.5 | 1 | 54 | 40 |
| Example 9 | 3.5 | None | 81 | 25 |
| Example 9 | 3.5 | 1 | 81 | 26 |
| Example 9 | 8 | None | 65 | 26 |
| Example 9 | 8 | 1 | 65 | 26 |
| Example 10 | 4 | None | 81 | 31 |
| Example 10 | 4 | 1 | 81 | 31 |
| Example 15 | 1.5 | None | 61 | 24 |
| Example 15 | 1.75 | None | 61 | 19 |
| Example 15 | 1.75 | 1 | 61 | 23 |

Generally speaking, it has been found that an average sample of untreated turbid river water will require about one week to clarify itself by settling. When treated with the instant polymeric materials, clarification is accomplished in about five minutes, a more than substantial decrease in time.

From the chart, it can be seen that the presence of chlorine has no effect or only a very slight effect on the functioning of the polymer, thus indicating that the polymeric material is substantially resistant to chlorine attack.

In general, it can be said that the polymeric products of this invention function better as clarifiers the higher their viscosities are, regardless of the particular secondary amine used, or the particular epihalohydrin used. Even with product of lower viscosity, significant water clarification can be achieved simply by increasing the dosage level.

Further tests were conducted to determine the compatibility of the products of this invention with standard inorganic coaqulant aids; i.e., the ability of the instant products to work with coagulant aids in clarifying aqueous systems.

TABLE II

| Polymer | Water Type | Coagulant Aid, ppm | Polymer Conc., ppm | Turbidity Initial | (JTU) Final |
|---|---|---|---|---|---|
| Example 1 | Sabine River | SPV Clay (20) | 2.25 | 65 | 30 |
| Example 1 | Sabine River | SPV CLAY (20) | 2.5 | 65 | 20 |
| Example 1 | Sabine River | SPV Clay (20) | 3.0 | 65 | 11 |
| Example 1 | Sabine River | Alum (10) | 1.75 | 65 | 26 |
| Example 1 | Sabine River | Alum (20) | 0.75 | 65 | 35 |
| Example 7 | Delaware River | SPV Clay (15) | 3.0 | 10 | 5 |
| Example 7 | Delaware River | Coaguloid Clay (5) | 3.0 | 10 | 2.4 |
| Example 7 | Sabine River | SPV Clay (20) | 2.25 | 65 | 35 |
| Example 7 | Sabine River | SPV Clay (20) | 2.5 | 65 | 25 |
| Example 7 | Sabine River | Alum (10) | 1.75 | 65 | 25 |

In all the above examples, significant clarification was achieved at a rate observed to be faster than in instances where clarification was accomplished using only polymeric material and no coagulant aid. Examples of other coagulant aids which can be beneficially employed with the instant polymeric materials are alum, iron salts, lime, coagulant clays and other flocculant polymers.

The amount of the polymeric material of this invention used to clarify a given turbid water will vary according to the amount of clarification desired, the type of turbidity, the viscosity of the treating material, etc. Generally, some clarification will occur no matter what the dosage may be and regardless of the actual polymeric viscosity. The lower the viscosity, the greater the polymeric dosage will have to be to obtain a given clarification. Obviously then, the dosage to be applied to a given aqueous system will depend on the particular facts of the case, and dosage is not considered by the applicants to be critical to their invention. Whatever amount is effective for a given purpose is considered to be embraced by the instant invention.

To demonstrate the difference between the flocculant made according to the inventive method and the flocculant made by the method taught by Panzer et al, the following comparative tests were conducted "side-by-side" by one of the present inventors.

EXAMPLE 16

Comparative Product A was made according to those teachings of Panzer et al which most closely approximate the present inventive method. To a one liter reaction kettle equipped with stirrer, thermometer, addition funnel and condenser was added 225.0 grams (2.0 moles) of 40% aqueous dimethylamine (DMA) and 20.7 grams (0.35 mole) of 29% aqueous ammonia ($NH_3$) to render a molar ratio of ammonia to total amines of 15%. To this, 185.1 grams (2.0 moles) of epichlorohydrin (EPI) were added dropwise over three (3) hours, with the temperature being maintained at 35°–40° C. When the addition of EPI was complete, the solution was heated to and maintained at 90° C for 30 minutes, at which time 6.0 grams (.15 mole) of sodium hydroxide were added. Then, EPI was added in 1 ml. portions at 90° C. Twenty minutes after each EPI portion was added, the viscosity of the solution was determined by flow through a pipette. The addition of EPI in 1 ml. portions, as described, was repeated until the desired viscosity was obtained. This required 15 portions (17.7 grams, 0.19 mole) of EPI. Next, 146.4 grams of water were added. The final viscosity (Brookfield LVT model, spindle 2, 12 rpm) was 600 cps. at 50.8% total solids, and the pH was 7.25.

Comparative Product B was made according to the present inventive method taught in the specification. To a one liter reaction kettle equipped with stirrer, thermometer, addition funnel and condenser was added 225.0 grams (2.0 moles) of 40% aqueous dimethylamine (DMA) and 20.7 grams (0.35 mole) of 29% aqueous ammonia ($NH_3$) to render a molar ratio of ammonia to total amines of 15%. To this, 185.1 grams (2.0 moles) of epichlorohydrin (EPI) were added dropwise over 3 hours, with the temperature being maintained at 35°–40° C. When the addition of EPI was complete, the solution was heated to and maintained at 90° C for 30 minutes. Then, EPI was added in 1 ml. portions at 90° C. Twenty minutes after each EPI portion was added, the viscosity of the solution was determined by flow through a pipette. The addition of EPI, in 1 ml. portions, as described, was repeated until the desired viscosity was obtained. This required 23 portions (27.14 grams, 0.29 mole) of EPI. Next, 154.4 grams of water were added. The final viscosity was 562 cps. at 50.2% total solids, and the pH was 6.88.

Comparative Products A and B were then placed in an oven at 122° F and the viscosities were determined periodically. The results are reported in Table A.

TABLE A

Viscosities (cps) of Comparative Product A and Comparative Product B placed in 122° F oven

| Day | 1 | 2 | 3 | 4 | 5 | 6 | 7 |
|---|---|---|---|---|---|---|---|
| Product A | 2000 | gel | | | | | |
| Product B | 925 | 1250 | 2050 | 4500 | — | — | gel |

On the fifth and sixth days the viscosity of Comparative Product B was not determined so that gellation could have occurred on either of these days.

From the results reported in Table A it should readily occur to the artisan that, not only is Comparative Product B more stable than Comparative Product A, but that Product B is apparently a different product.

We claim:

1. The process of flocculating undesirable particulate matter from an aqueous medium, which comprises, adding to said medium an effective amount of a quaternary, cationic, polymeric material consisting essentially of the reaction product of a caustic addition free reaction mixture of an epihalohydrin, ammonia and a lower dialkylamine, wherein said amine has from 1 to 3 carbons per alkyl group, wherein the amount of the ammonia ranges from about 15% to 33% of the total molar amount of the ammonia-amine concentration, wherein the ratio of the epihalohydrin to said ammonia-amine concentration is from about 0.9 up to the functional limit of said concentration, and wherein said polymeric material has a viscosity of from about 50 cps to about 4000 cps (Brookfield, spindle 1, 12 rpm) at a real solids content of from about 45% to about 55%.

2. The process of claim 1, further comprising adding to said aqueous medium an amount of a coagulant aid along with said polymeric material.

3. The process of claim 1, wherein said ammonia amount is from about 17% to about 25% of said total molar amount of ammonia-amine concentration.

4. The process of claim 3, wherein said lower dialkylamine is di-methylamine and said epihalohydrin is epichlorohydrin.

5. The process of claim 4, wherein said viscosity is from about 100 cps to about 4000 cps and wherein said real solids content is about 50%.

6. The process of claim 5 further comprising adding to said aqueous medium an amount of a coagulant aid along with said polymeric material.

* * * * *